(No Model.) 3 Sheets—Sheet 1.
C. E. & H. L. WHITMAN.
FRICTION CLUTCH AND BRAKE FOR BALING PRESSES.
No. 392,898. Patented Nov. 13, 1888.
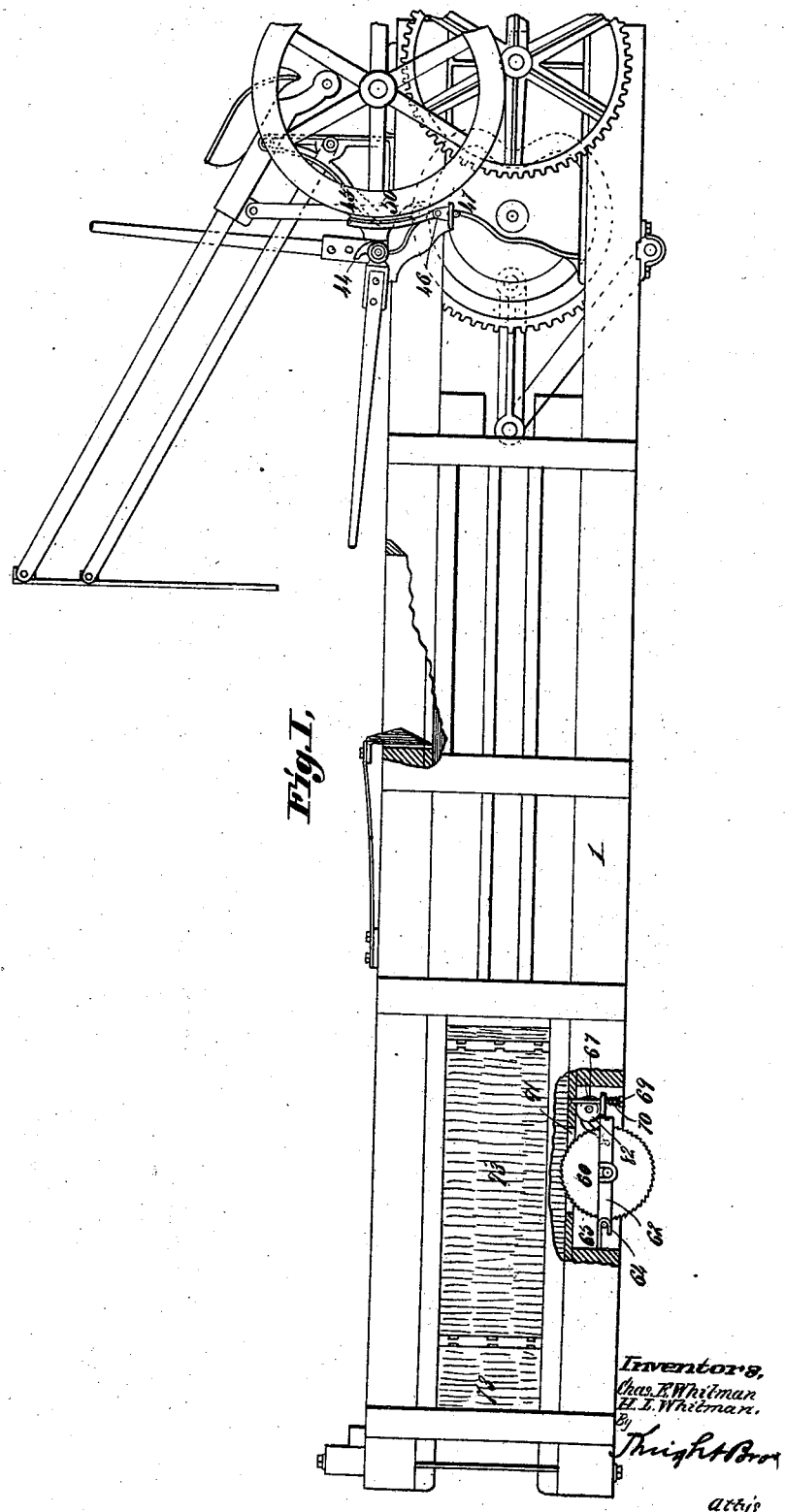

(No Model.) 3 Sheets—Sheet 2.
C. E. & H. L. WHITMAN.
FRICTION CLUTCH AND BRAKE FOR BALING PRESSES.
No. 392,898. Patented Nov. 13, 1888.
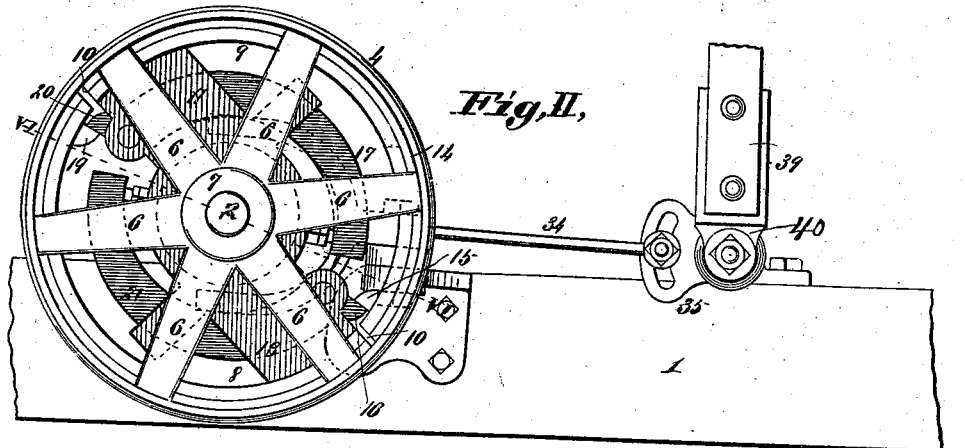
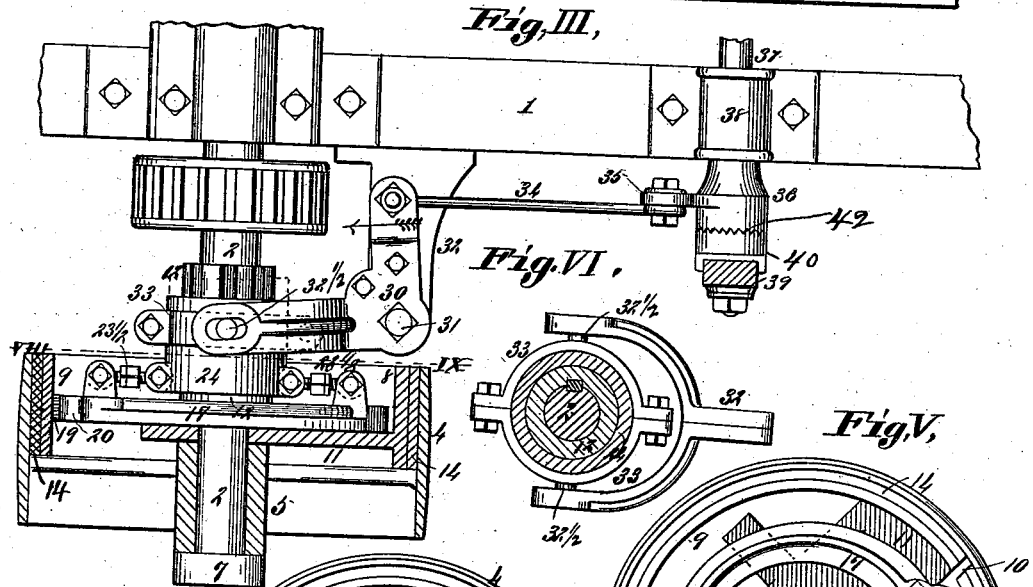
Attest:
Charles Pickles.
B. Ashley.
Inventors,
Charles E. Whitman,
Henry L. Whitman,
By Knight Bros
Attys.

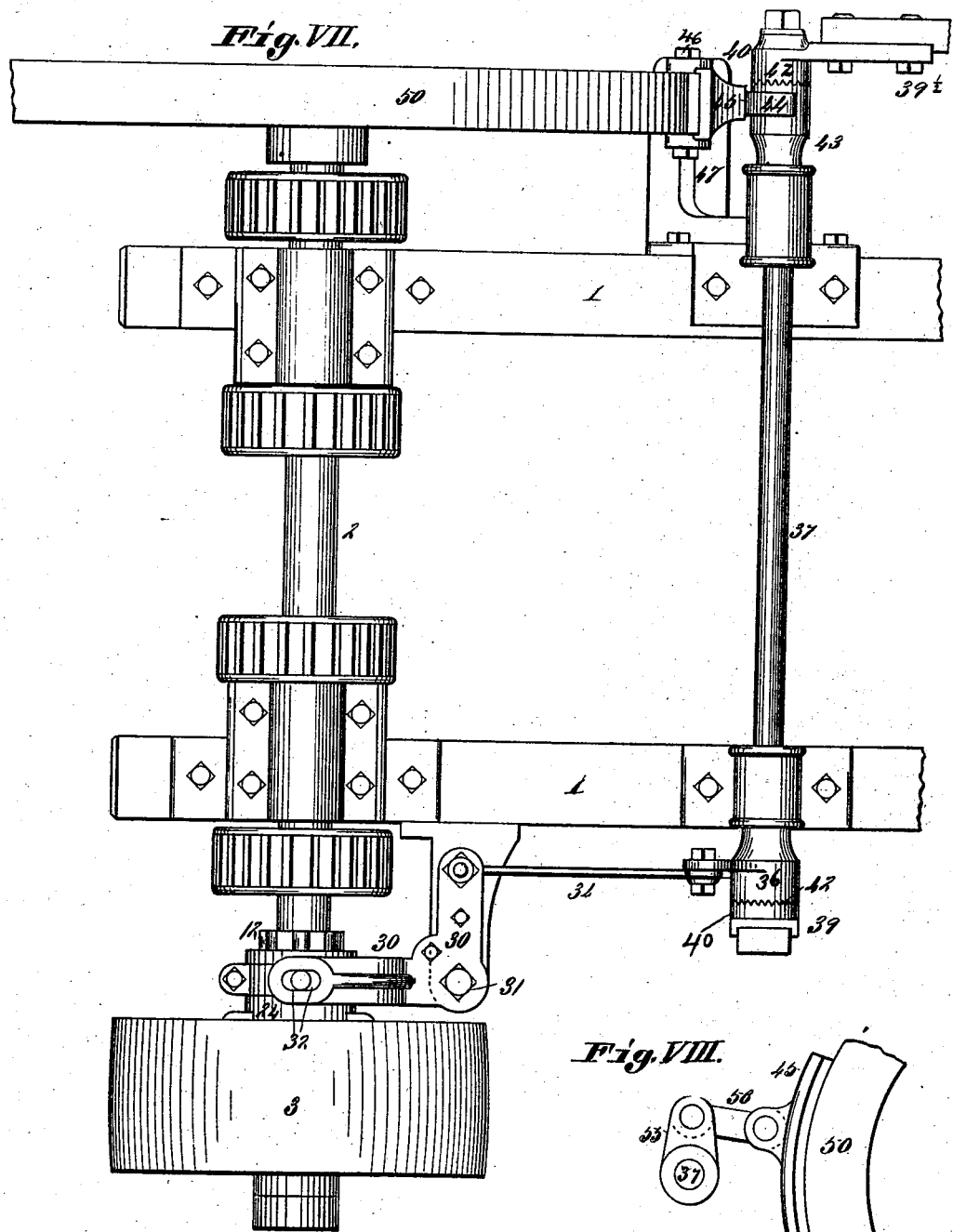

UNITED STATES PATENT OFFICE.

CHARLES E. WHITMAN AND HENRY L. WHITMAN, OF ST. LOUIS, MISSOURI.

FRICTION-CLUTCH AND BRAKE FOR BALING-PRESSES.

SPECIFICATION forming part of Letters Patent No. 392,898, dated November 13, 1888.

Application filed October 14, 1887. Serial No. 252,365. (No model.)

*To all whom it may concern:*

Be it known that we, CHARLES E. WHITMAN and HENRY L. WHITMAN, both of the city of St. Louis, in the State of Missouri, have invented a certain new and useful Improvement in Friction Clutches and Brakes for Baling-Presses, of which the following is a full, clear, and exact description, reference being had to the accompanying drawings, forming part of this specification, in which—

Figure I is a side elevation of a baling-press, showing a portion broken away and parts in section, with our improvements in connection therewith. Fig. II is an enlarged detail view of the friction-pulley in side elevation. Fig. III is a section through the pulley, taken on line VI VI, Fig. II, this figure also showing parts in top view. Fig. IV is an elevation of the friction-pulley, and Fig. V is a section through the sliding collar of the pulley and through the shaft, the pulley being shown in elevation. This section is taken on line VIII IX, Fig. III. Fig. VI is a section taken on line VIII IX, Fig. III, looking toward the machine. Fig. VII is a detail top view showing the friction-pulley and brake. Fig. VIII is a detail modification.

Our invention consists in features of novelty hereinafter fully described, and pointed out in the claims.

Referring to the drawings, 1 represents the frame of the press, 2 represents the driving-shaft, and 3 a pulley on the shaft. The pulley (see Figs. II to VI, inclusive) consists of an outer rim, 4, held loosely on the shaft 2 by means of a spider composed of a hub, 5, and arm 6. This part of the pulley is loose upon the shaft and is held thereon by means of a collar, 7. The driving-belt (not shown) passes around this part of the pulley. Within the part 4 of the pulley is a ring made of two parts, 8 9, the parts being separated, as shown at 10. One end of the part 9 of the ring is secured to an arm, 11, on a hub or ring, 12, and one end of the part 8 of the ring is secured to an arm, 13, of the hub or ring 12. It will be seen that one end of each part 8 9 is free to be forced outward. This is shown most clearly in Figs. IV and V. The ring 8 9 may bear against the inner face of the part 4 of the pulley; but I prefer to interpose a bushing or ring, 14, of wood or some other suitable material. This ring 14 would be made in two parts corresponding with the parts 8 and 9 of the inner ring. On the free end of the part 8 of the inner ring is a lug, 15, against which bears a corresponding lug, 16, on a lever, 17, pivoted at 18 to the arm 11. On the free end of the part 9 of the ring is a lug, 19, against which bears a corresponding lug, 20, of a lever, 21, pivoted at 22 to the arm 13. The free end of the lever 17 is connected by a rod, 23, to a sliding collar, 24, fitting over the hub or ring 12 of the arm 13. The hub 12 is rigidly secured to the driving-shaft 2, (see 25, Fig. V,) and the collar 24 turns with it. The other end of the lever 21 is connected by a rod, 26, to the collar 24 on the opposite side of the collar to the rod 23. The collar 24 may be moved from the position shown in dotted lines, Fig. III, to the position shown in full lines, and vice versa. As it is moved from the position shown in dotted lines to the position shown in full lines, it will be understood that it will force the free ends of the levers 17 and 21 outward through means of the connecting-rods 23 and 26. As it does this, the lugs 16 and 20 bear against the lugs 15 and 19 and force the ring 8 9 (or the bushing 14, if it is used) into frictional contact with the part 4 of the pulley, thus causing the shaft 2 to be turned. As the sleeve 24 is moved in the other direction, the ring 8 9 (or the bushing 14) will be moved out of frictional contact with the part 4 of the pulley, and the part 4 of the pulley will be allowed to turn on the shaft without rotating the latter. It will be understood that there is sufficient elasticity in the parts 8 9 of the ring to cause the parts to spread out against the part 4 of the pulley between their free ends and the points of connection with the arms 11 and 13.

The sleeve 24 is preferably operated or moved by means of a bell-crank lever, 30, pivoted at 31 to an arm, 32, secured to the frame 1 of the machine. (See Figs. II and III.) One end of the lever 30 is bifurcated, and has slot-and-pin connection 32½ with a ring, 33, surrounding and fitting in a groove of the collar 24. Connected to the other end of the lever 30 is one end of a rod, 34, the other end of which is made fast to an arm, 35, having a hub, 36, rigidly secured to a rock-shaft, 37, journaled in boxes 38, by which it is secured to the frame 1 of the machine. It will be seen that when the shaft is rocked to move the lever 30 in the direction of the arrow, Fig. III, the collar 24 will be forced toward the driving-pulley, and when the lever is moved in the other direction the collar will be moved away from the driving-pulley. The shaft 37 is operated by means of levers 39 39½, one on each end of the shaft. The levers 39 39½ have castings 40, by which they are secured to the shaft, the casting of lever 39 having notches on its inner face, which engage with teeth on the outer faces of the hub 36, as shown at 42, Figs. IV and VII. By the use of these teeth the lever 39 may be adjusted to the most convenient position for operating it. On the other end of the shaft 37 from the lever 39 is a hub, 43, having a cam, 44, formed thereon, which bears against a brake-shoe, 45, pivoted at 46 to a casting, 47, secured to the frame 1 of the machine. The cam is shown most plainly in Fig. I. The casting 40 of the lever 39½ at this end of the shaft 37 is connected to the hub 43 by means of teeth 42, similar to those 42 at the other end of the shaft. The cam is so disposed in relation to the friction-pulley mechanism just described that when the shaft 37 is turned to release the friction-pulley and allow the machine to stop the brake-shoe 45 is forced by the cam 44 (by whichever one of the levers 39 is most convenient) into frictional contact with a wheel, 50, on the shaft 2, to stop the machine. The wheel 50 is secured to the driving-shaft 2, so that as soon as the friction-pulley is released the brake stops the rotation of the driving-shaft. When the shaft 37 is moved in the other direction, the brake is removed from the wheel 50 and the friction-pulley is thrown into working position.

In Fig. VIII we have shown a slight modification of the brake, which consists of a crank, 55, secured to the shaft 37, and a link, 56, connecting the crank to the shoe 45.

The rods 23 and 26 are made adjustable to compensate for wear, and they are preferably made adjustable by making each in two parts and providing their adjacent ends with right and left threads to receive nuts 23½. By turning the nuts the lengths of the rods will be adjusted, as stated.

Instead of the brake-shoe bearing upon the outer surface of the wheel, it is evident that the same could bear upon the inner surface or upon the edge of the wheel.

We claim as our invention—

1. In a baling-press, the combination of the main driving-shaft and friction-pulley, the latter consisting of an outer ring, an inner ring made in parts, one end of each part being fixed and the other free, lugs on the free ends of the parts of the inner ring, pivoted levers, lugs on the pivoted ends of the levers bearing against the lugs on the parts of the inner ring, sliding collar, the free ends of the levers being connected to the collar, and means for sliding the collar, substantially as and for the purpose set forth.

2. In a baling-press, the combination of the driving-shaft and friction-pulley, the latter consisting of an outer ring, an inner ring made in parts, one end of each part being fixed and the other free, pivoted levers in contact with the free ends of the parts of the inner ring, sliding collar, adjustable rods connecting the sliding collar to the free ends of the levers, and means for moving the sliding collar, substantially as and for the purpose set forth.

3. In a baling-press, the combination of the driving-shaft and pulley, the latter consisting of an outer ring, an inner ring made in parts, one end of each part being fixed and the other end free, bushing located between the inner and outer rings, lugs on the free ends of the inner ring, levers pivoted to arms on a hub fitting on said shaft, lugs on the pivoted ends of said levers, sliding collar, adjustable rods connecting the collar to the free ends of said levers, right and left hand nuts for adjusting the lengths of said rods, and means for sliding said collar, substantially as and for the purpose set forth.

4. In a baling-press, the combination, with the driving-shaft, of a friction-pulley and a brake-wheel thereon, a brake for engaging said wheel, a rock shaft extending athwart the press and connected with said brake and friction-pulley, whereby they may be operated simultaneously, and an operating-lever at each end of said shaft, whereby the latter may be rocked from either side of the machine, substantially as set forth.

5. In a baling-press, the combination of the driving-shaft, friction-pulley, rock-shaft provided with an operating-lever and connected to said friction-pulley, whereby the latter is thrown in and out of gear, brake-wheel, brake-shoe pivoted near the wheel, and a cam on said rock-shaft for bearing against the brake-shoe and forcing it into frictional contact with said brake-wheel, substantially as and for the purpose set forth.

6. In a baling-press, the combination of the driving-shaft, brake-wheel on the shaft, brake-shoe, rock-shaft, the rock-shaft being provided with an operating-lever, and the cam on the shaft adapted to bear against the shoe and press it against the brake-wheel, substantially as and for the purpose set forth.

CHAS. E. WHITMAN.
HENRY L. WHITMAN.

In presence of—
GEO. H. KNIGHT,
JOS. WAHLE.